(12) United States Patent
Campise et al.

(10) Patent No.: US 8,352,564 B1
(45) Date of Patent: Jan. 8, 2013

(54) SYSTEM AND METHOD FOR DATA COLLECTION AND UPDATE UTILIZING SURROGATE E-MAIL ADDRESSES USING A SERVER

(75) Inventors: Leon Campise, Plano, TX (US); Mike Leftwich, Farmers Branch, TX (US)

(73) Assignee: Intuit Inc., Mountain View, CA (US)

( * ) Notice: Subject to any disclaimer, the term of this patent is extended or adjusted under 35 U.S.C. 154(b) by 5 days.

(21) Appl. No.: 13/220,427

(22) Filed: Aug. 29, 2011

Related U.S. Application Data

(62) Division of application No. 10/419,289, filed on Apr. 18, 2003, now Pat. No. 8,032,592.

(60) Provisional application No. 60/373,822, filed on Apr. 18, 2002.

(51) Int. Cl.
*G06F 15/16* (2006.01)
(52) U.S. Cl. .......................................... 709/206
(58) Field of Classification Search .................. 709/206
See application file for complete search history.

(56) References Cited

U.S. PATENT DOCUMENTS

| | | | |
|---|---|---|---|
| 5,826,269 A | 10/1998 | Hussey | |
| 5,937,160 A | 8/1999 | Davis et al. | |
| 6,272,532 B1 | 8/2001 | Feinleib | |
| 6,636,888 B1 * | 10/2003 | Bookspan et al. | 709/203 |
| 6,721,785 B1 | 4/2004 | Raghunandan | |
| 6,741,855 B1 | 5/2004 | Martin et al. | |
| 7,127,491 B2 | 10/2006 | Zirnstein, Jr. | |
| 7,269,624 B1 * | 9/2007 | Malik | 709/206 |
| 2002/0002581 A1 | 1/2002 | Siddiqui | |
| 2002/0046248 A1 | 4/2002 | Drexler | |

OTHER PUBLICATIONS

Postel, RFC 821: Simple Mail Transfer Protocol, Aug. 1982, pp. 8-9.

* cited by examiner

*Primary Examiner* — John Macilwinen
(74) *Attorney, Agent, or Firm* — Osha Liang LLP

(57) ABSTRACT

A system and method for data collection and update utilizing surrogate e-mail addresses using a server. An e-mail client generates an e-mail message comprising a surrogate e-mail address and data elements conveyed within standard fields of the e-mail message. The surrogate e-mail address also comprises data and instructions directed to a specialized software program. A message server parses the surrogate e-mail address and the e-mail content. Information relating to a specialized software program is extracted and translated into instructions and data elements. The specialized software program operates on the data elements based on the instructions obtained from the e-mail message.

45 Claims, 7 Drawing Sheets

SYSTEM AND METHOD FOR DATA COLLECTION AND UPDATE UTILIZING SURROGATE E-MAIL ADDRESSES USING A SERVER

CROSS REFERENCE TO RELATED APPLICATIONS

This application is a divisional of U.S. patent application Ser. No. 10/419,289, filed on Apr. 18, 2003, and entitled "System and Method for Data Collection and Update Utilizing Surrogate E-Mail Addresses Using A Server." U.S. patent application Ser. No. 10/419,289 claims priority under 35 U.S.C. §119(e) from U.S. Provisional Patent Application Ser. No. 60/373,822 filed on Apr. 18, 2002. The 60/373,822 provisional application is incorporated by reference herein, in its entirety, for all purposes.

FIELD OF THE INVENTION

The present invention relates to the acquisition of information. More specifically, the present invention relates to using a ubiquitous software application to capture instructions and data elements directed to a specialized software program.

BACKGROUND OF THE INVENTION

In many companies, specialized software programs are acquired or developed to meet a specific business requirement of the company. A few examples of these specialized software programs include time collection and/or time billing software for professional services, customer relationship management software for sales organizations, accounting and payroll software for accounting groups, and human resources management software for staffing professionals.

These specialized programs often include complex and powerful features that represent the value for which the company invested in the specialized software. However, using specialized software generally requires training and assistance until the features are mastered. Productivity is lost when employees spend time in training or struggling to learn to use the specialized software. The investment of time in learning to use the specialized software is usually justified for those employees whose job requires them to utilize complex and powerful features to deliver value to the business. But for those employees whose interaction with the specialized software is limited to simple and occasional data entry or correction, the loss of productivity while struggling to understand unfamiliar software programs is much more difficult to justify. In many companies, the group of employees fully utilizing the features of the specialized software is quite small in comparison to the group whose use of the software is limited to simple entry or updating of data.

By way of illustration, the features of a time collection and billing software program are typically exploited to their fullest extent by a small number of administrative and accounting staff members responsible for generating invoices from time entries, applying invoice payments, and generating staff payroll. The timekeeping professionals, who greatly outnumber the administrative staff in the typical firm, need only enter their time entries. Entering a time entry requires conveying a few bits of information such as the client and project, the dates and duration of work performed, and perhaps some notes about the work. Unfortunately, in order to enter those bits of information the professional must attend training or struggle to learn to use the time collection/billing software, despite the fact that the timekeeping professional will never utilize more than a small percentage of the software features.

In the case of customer relationship management software, the professional sales staff may fully utilize the myriad features of the program in order to conduct campaigns, follow up on leads, and track customer purchase activity. However, other employees such as customer service representatives, mailroom personnel, even receptionists may need to occasionally create, update or look up customer contact information. In order to perform these simple tasks, the other employees must be trained and assisted in the use of the customer relationship management software when they utilize only its simplest features.

Accounting and payroll software is typically among the most complex of the specialized software programs illustrated. Accounting staff require the ability to configure and utilize a wide range of accounting rules and principles embodied in the software. This often requires an intimate knowledge of both accounting practices and software. In most companies, few individuals understand the intricacies involved, yet a large number of employees may be required to submit expense reports for reimbursement or submit other expenses that must be applied to a client invoice. This large group of employees must therefore be trained to use some portion of the accounting software in order to submit these expenses, diminishing their productivity.

Human resources staffs require access to a wealth of information about former employees, current employees, and job candidates, including work eligibility, employment history, work schedules, qualifications/skills, salary history, benefits information and much more. In most companies, the human resources staff is a small group, yet every employee must occasionally interact with the human resources software to request paid time off, to report sick time, to modify tax status, or to update benefit information.

Despite their specificity, these specialized software programs (both those exemplified above and many others not specifically mentioned) have several common elements. All store their data in some type of datastructure. All require some form of data entry and data update, and most have some method of exchanging information with other external systems.

A final relevant observation is the contrasting ubiquity of certain other categories of software, such as e-mail and calendar programs (e.g., Microsoft Outlook, Lotus Notes). In a given company, a high percentage of employees using a computer have access to one of these software programs. In addition, handheld devices with wireless or synchronization capabilities such as RIM Blackberry, personal digital assistants (e.g., Palm, iPaq), Internet-capable cellular telephones, two-way pagers, and other similar devices are increasingly utilized for messaging, calendaring, and other personal management and communication activities. Employees use these devices and software programs for a wide range of productive activities, making the training in their use easily justifiable for the company. These programs are often easier to use than more specialized programs because their publishers invest heavily in the design and testing of the software user interface to ensure usability across a wide spectrum of computing skills. In addition, the very ubiquity of the software ensures that users have already learned to use the software or will learn to use it in the normal course of business.

The calendar paradigm is an obvious choice for recording time, so many time tracking systems employ a calendar view within their proprietary software. The disadvantage to the user is that the proprietary software represents a separate software application from their personal information manager (e.g., Microsoft Outlook, Lotus Notes). It is a separate calendar in a separate program with separate and additional learning and usage requirements.

A few other commercial software systems provide a type of integration with a personal information manager like Microsoft Outlook by injecting their own additional user interface elements into the personal information manager, such as menu commands, forms or dialog boxes. While this approach adds functionality, the external software must be installed on the user's computer, where it provides separate and additional user interface elements within the personal information manager. These additional user interface elements naturally carry additional learning requirements. The advantage these products present to the user experience is limited to the convenience of not having to launch a separate program. These products do not leverage the e-mail functionality to create or transport the time entries. Data is saved and retrieved in the normal storage media used by the proprietary software.

At least one company provides a time tracking system that facilitates offline time entry by leveraging the user's existing e-mail software infrastructure. When offline, the proprietary software embeds time entry information into a specially formatted e-mail message. The specially formatted message is sent to a designated "gateway" e-mail box that is monitored by a proprietary software program. The gateway program then reads the e-mail message, decodes the time entry information within the proprietary payload for entry into the time entry system. This approach utilizes the store-and-forward capabilities of the user's messaging system to provide an offline use mode. However, the proprietary software must be installed on the computer of each user in order for that user to record time. The interface with which the user interacts is the proprietary software's user interface, not the interface of the existing e-mail system. The user is required to install and learn the proprietary software. The only role that the e-mail system plays is in transporting the data when offline.

What would be useful would be a system and method that utilizes ubiquitous software programs to permit users to provide input to specialized software programs without the need for modification of the ubiquitous software programs, without requiring the installation of any new software on the user's computer, and without requiring excessive user training.

SUMMARY OF THE INVENTION

In an embodiment of the present invention, a user creates an e-mail message, addressing it to a surrogate e-mail address. A message server receives the e-mail message addressed to the surrogate e-mail address, interprets the address, extracts information from other message parts (FROM, SUBJECT, NOTES, attachments, etc.) and directs a specialized software program to enter, update or delete appropriate data elements. The user is not, therefore, required to use, install or learn the specialized software program. The user only needs to know how to send an e-mail message and to whom the e-mail should be addressed.

Therefore, an aspect of the present invention is to use a message server to convey data and instructions to a specialized software program.

Another aspect of the present invention is the use of an e-mail address as a surrogate (a surrogate e-mail address) to represent significant data elements in and/or operations upon a specialized software program.

Yet another aspect of the present invention is a label that maps to a surrogate e-mail address. By way of illustration and not as a limitation, a label that maps to a surrogate e-mail address may be in the form of a contact entry in a contract list or in address book stored an e-mail server that is accessible to an e-mail client.

Yet another aspect of the present invention is a message server that parses industry-standard e-mail messages and e-mail messages comprising meeting invitations, extracting from the e-mail message fields of information directed to a specialized software program, and then translating the information into a specific instruction or data elements that are acted upon by a specialized software program.

Still another aspect of the present invention is a message server that monitors the e-mail server to determine if data has been recorded that is reportable to a data server and transports the reportable data without further direction.

Another aspect of the present invention is a message server that monitors the specialized software program and provides updates to a directory of surrogate e-mail addresses accessible to an e-mail client. By way of illustration and not as a limitation, the directory of surrogate e-mail addresses may be in the form of a contact list or an address book stored in an e-mail server that is accessible to an e-mail client.

These and other aspects of the present invention will become apparent from a review of the description that follows.

In an embodiment of the present invention, a user creates an e-mail message, addressing it to a surrogate e-mail address. A message server receives the e-mail message addressed to the surrogate e-mail address, interprets the information embedded in the address, extracts information from other message parts (FROM, SUBJECT, NOTES, attachments, etc.) and directs a specialized software program to enter, update or delete appropriate data elements. The user is not, therefore, required to use or learn the specialized software program. The user only needs to know how to send an e-mail message and to whom the e-mail should be addressed.

The surrogate e-mail address comprises elements that identify a unique context and/or action to be taken. By way of illustration and not as a limitation, such elements may include an account number, project identifier, task, expense code, employee number, and information identifying a particular company and a target software application. The e-mail address is distributed to the user in the form of a "contact" comprising the e-mail address plus additional information that helps the user to identify the purpose and usage of the surrogate address. By way of illustration and not as a limitation, the contact name might describe the name of the client/project, the type of expense, the name of the employee, or the classification of the account.

In an embodiment of the present invention, the message server is installed on, or is accessible to, the specialized software program. The message server receives e-mail messages sent over the Internet or network via Simple Message Transport Protocol (SMTP) and applies the necessary translation operation to the instructions and data elements conveyed by the e-mail message so that the instructions may be implemented, and the data elements may be used by the specialized software program. This translation operation is performed via any appropriate programmatic means such as Structured Query Language (SQL) queries of the database, Application Programming Interface (API) calls provided by the specialized software program, exchanging files, Simple Object Access Protocol (SOAP), Distributed Common Object Model (DCOM), Common Object Request Broker Architecture (CORBA), and Microsoft .NET Remoting. However, this is not meant as a limitation. As will be apparent to those skilled in the art, other programmatic translation means may be used without departing from the scope of the present invention.

In another embodiment of the present invention, the message server is installed on, or is accessible to, a user's e-mail server. In this configuration, the message server monitors, intercepts and parses e-mail messages before the e-mail message is actually transmitted over the Internet via SMTP. The message server parses the e-mail message, determines the appropriate translation operation, and executes the translation operation using any of the technologies listed above.

In another embodiment of the present invention, a message agent is installed on, or is accessible to, a user's e-mail server, while a message server is installed on, or is accessible to, the specialized software program. The message server associated with specialized software program generates a surrogate e-mail address contact record and sends it to the message agent associated with the e-mail server. The message agent associated with the e-mail server inserts, updates and deletes the contact record in the e-mail server's global address list and/or in each user's personal contact folder located on the e-mail server. This embodiment frees the user from maintenance tasks related to the surrogate e-mail addresses, further improving the user experience.

In yet another embodiment of the present invention, the message server is installed on, or is accessible to, an e-mail server. The e-mail server may optionally comprise one or more time management functions accessible to an e-mail client. By way of illustration and not as a limitation, a time management function comprises a calendar function, a task function, and a journal function. In an alternate embodiment, each time management function comprises a utility that is accessible to the e-mail server. The message server monitors the e-mail server (and any time management functions) to determine if information reportable to a data server has been recorded. If information reportable to a data server has been recorded, the message server automatically sends an e-mail message to the appropriate surrogate address in lieu of the user sending a message. Another instance of the message server receives the e-mail message and performs the translation operation. Alternatively, the message server monitoring the e-mail server performs the translation operation as previously described.

In another embodiment of the present invention, the message server interacts with a time collection and billing system. Timekeepers (i.e., professionals whose time is billed to clients) are provided with contacts (i.e., surrogate e-mail addresses associated with labels) that act as surrogates for client/projects to which time is billed. A timekeeper creates a time entry by scheduling a "meeting" for the time period in the calendar representing the start time and duration of the billable work. The timekeeper "invites" a surrogate contact representing the client/project to the "meeting". The calendar function sends a meeting invitation e-mail message to the surrogate e-mail address, which is received by the message server. The message server interprets the e-mail message in the context of a time entry and inserts a time entry into the time collection/billing software.

In yet another embodiment of the present invention, the message server interacts with a customer relationship management system. Employees who need occasional access to the data are provided with contact entries in an address book comprising a surrogate e-mail address and basic information about the customer (names, addresses, telephone numbers, etc.) that can be used to look up customer contact information as well as surrogate e-mail addresses. If an employee needs to update a customer's information, the employee sends an e-mail message to the surrogate address, attaching the updated contact entry to the e-mail message. The message server interprets the e-mail address and attached contact and uses that information to update the customer record in the customer relationship management system.

In another embodiment of the present invention, the message server interacts with an accounting system. Employees are provided with surrogate e-mail addresses that act as surrogates for client/project accounts in the accounting system. To charge an expense amount to a client/project, the employee schedules a "meeting" with the surrogate e-mail addresses representing the appropriate client/project. The employee enters an amount in the SUBJECT of the e-mail message, adds any notes in the NOTES area of the e-mail message, and then sends the meeting invitation e-mail message. The message server interprets the e-mail address and other fields of the e-mail message to create a new expense report in the accounting system.

In still another embodiment of the present invention, the message server interacts with the human resources management system to schedule paid time off, report sick time, modify tax status, or update benefit information. Employees schedule paid time off and report sick time by scheduling a "meeting" in their calendar. The START DATE/START TIME and END DATE/END TIME of the meeting correspond to the time scheduled or reported. The employee invites a contact (comprising a surrogate e-mail address) to the meeting that acts as a surrogate for vacation or sick time in the human resources software. The calendar function sends an e-mail message to the surrogate address, which is received by the message server. The message server interprets the e-mail message and schedules the time off or sick time in the human resources management system. Modifying tax status or benefit information works similarly. A meeting is scheduled with a contact that acts as a surrogate for the change, and the new value is included in the SUBJECT of the e-mail message. The message server interprets the e-mail message and performs the appropriate action in the human resources management system.

DETAILED DESCRIPTION OF THE INVENTION

In an embodiment of the present invention, a user creates an e-mail message, addressing it to a surrogate e-mail address. A message server receives the e-mail message addressed to the surrogate e-mail address, interprets the information embedded in the address, extracts information from other message parts (FROM, SUBJECT, NOTES, attachments, etc.) and directs a specialized software program to enter, update or delete appropriate data elements. The user is not, therefore, required to use or learn the specialized software program. The user only needs to know how to send an e-mail message and to whom the e-mail should be addressed.

Figure 1:
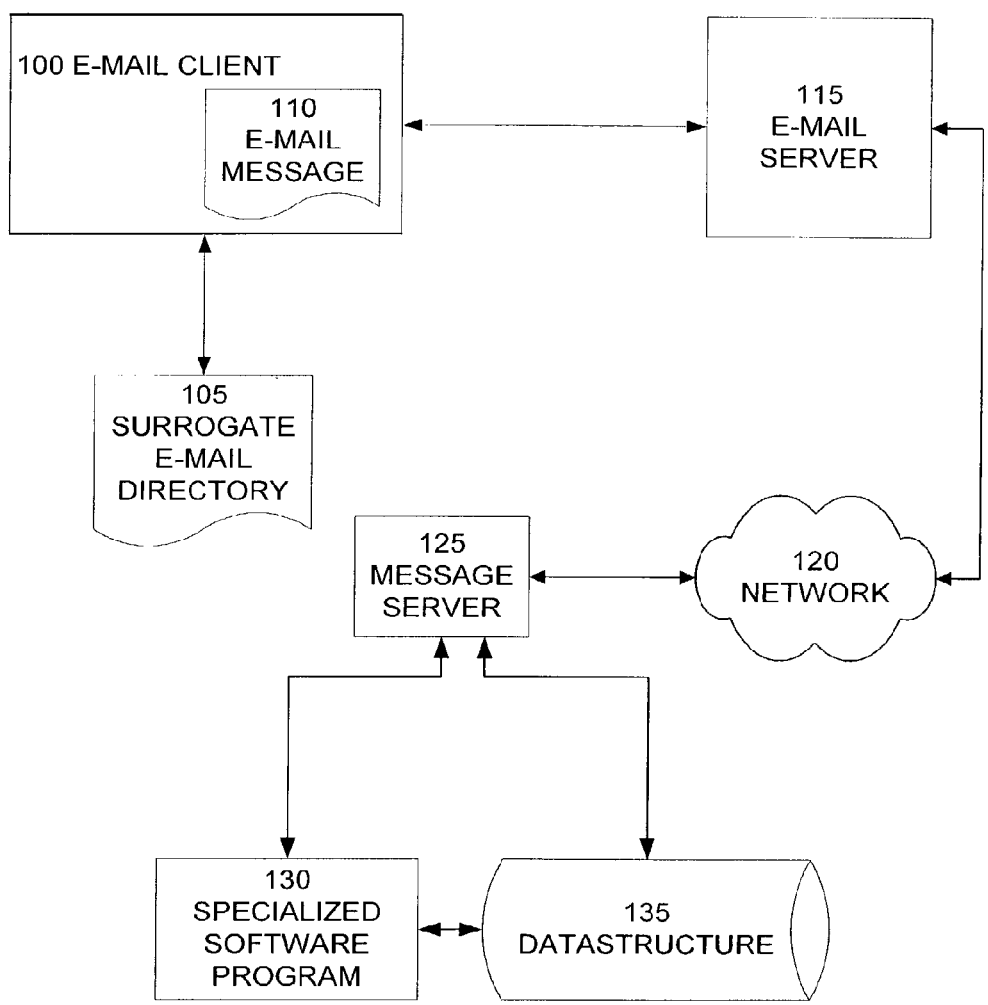
FIG. 1 illustrates a block diagram of a system for data collection and update utilizing surrogate e-mail addresses according to an embodiment of the present invention.

FIG. 1 illustrates a block diagram of a system for data collection and update utilizing surrogate e-mail addresses according to an embodiment of the present invention. An e-mail client 100 accesses a directory 105 of surrogate e-mail addresses. An e-mail message 110 is constructed and sent to e-mail server 115. The e-mail message 110 may be constructed by a user using the e-mail client 100 or by an application used by the user. By way of illustration and not as a limitation, in an alternate embodiment of the present invention, an e-mail message is constructed by a calendar function that communicates with the e-mail client 100 where the e-mail message 110 is in the form of a meeting invitation. The user "invites" a surrogate contact comprising a surrogate e-mail address to the "meeting". The calendar function sends a meeting invitation e-mail message to the message server associated with the surrogate e-mail address.

To the user (not shown), the e-mail client 100 and the e-mail server 115, the e-mail message 110 is like any other e-mail communication. However, in this embodiment, e-mail message 110 is sent to an e-mail address (the "surrogate e-mail address") that acts as a surrogate for instructions and data elements directed to a specialized software program 130. The surrogate e-mail address itself comprises elements that identify a unique context and/or action to be taken.

In embodiment, the surrogate e-mail address comprises an identifier that uniquely associates a value with an entry in a datastructure. The identifier may comprise the whole surrogate e-mail address or may be parsed from the surrogate e-mail address. In another embodiment, the surrogate e-mail address may comprise a plurality of identifiers, each of which associates a value with an entry in a datastructure.

The surrogate e-mail address is generated based upon the particulars of the data elements being entered, updated or deleted for a particular specialized software program. An example surrogate e-mail address in the time collection and billing or customer relationship management context could be formatted as 123.456@company.domain.com where "123" represents a unique client identifier, "456" represents a unique.project identifier for client 123, "company" represents a code or name identifying the company using the invention, and "domain.com" represents the actual Internet domain monitored by the message server. An example surrogate e-mail address identifying a billable expense item in an accounting system is: 123.456.789@company.domain.com where "123" represents a client, "456" represents a project, and "789" represents a general ledger account number in the accounting system. In the case of a human resources system, an exemplary surrogate e-mail address is: vacation@company.domain.com, where "vacation" is a label that uniquely identifies the type of request or action. In any of these examples, the order, type and location of each portion is not critical so long as the order is known to a message server 125 (described below). Thus, there is no functional difference among vacation@company.domain.com, vacation company@domain.com, company.vacation@domain.com, or any other such combination. These examples (above) are not meant as a limitation. The invention does not rely upon any single format, so long as the e-mail address provides information sufficient to uniquely identify the necessary key field or fields of information. The only requirement is that the domain portion (e.g., "domain.com") be the last portion of the address, since this is a requirement for e-mail delivery within the established standards for the Internet.

For ease of use, the surrogate e-mail address is packaged into a contact entry. In an embodiment of the present invention, the contact entry further comprises client and/or project names, general ledger account descriptions, and other information helpful to the user in locating the correct surrogate address. The contact entry is not required for the function of the invention, but facilitates ease of use. In yet another embodiment of the present invention, a contact entry is mapped to a label that is used in place of the surrogate e-mail address.

The surrogate e-mail addresses can be distributed to users in any of several ways. The contacts can be added to a global address list of a company's e-mail server 115, they can be added to an address or contact list of individual users stored on an e-mail server 115, or they can be distributed to users who then manually add them to their address or contact list using their e-mail client 100.

The e-mail message 110 is conveyed via a network 120 to a message server 125. The message server 125 identifies the e-mail message 110 as having a surrogate e-mail address. The message server 125 parses the surrogate e-mail address and e-mail message 110, and translates the instructions and data elements conveyed by the e-mail message 110 so that the data may be accessed and used by the specialized software program 130. By way of illustration, specialized software program 130 may be a time collection and billing system, a customer relationship management system, accounting system, or a human resources system. However, the present invention is not so limited. As will be apparent to those skilled in the art, other specialized software programs may be used with the systems and method herein described without departing from the scope of the present invention.

The translation operation is managed via any programmatic means. By way of illustration and not as limitation, the translation operation may be managed using Structured Query Language (SQL) queries of the database, Application Programming Interface (API) calls provided by the specialized software, exchanging files, Simple Object Access Protocol (SOAP), Distributed Common Object Model (DCOM), Common Object Request Broker Architecture (CORBA), and Microsoft .NET Remoting. However, this is not meant as a limitation. As will be apparent to those skilled in the art, other programmatic translation means may be used without departing from the scope of the present invention.

Both the message server 125 and the specialized software program 130 access a datastructure 135. Datastructure 135 provides storage for records used by the specialized software program 130. If the specialized software program provides an appropriate programmatic interface, the message server 125 communicates instructions and data elements to the specialized software program 130 through that programmatic interface. Alternatively, where no appropriate programmatic interface is available, the data server interfaces with the datastructure 135 to perform data operations (add, delete, or update) directly on data that is accessible to the specialized software program 130.

While a single datastructure 135 is illustrated in FIG. 1, this is not meant as a limitation. As will be apparent to those skilled in the art, datastructure 135 may comprise discrete datastructures without departing from the scope of the present invention.

In an embodiment of the present invention, network 120 is the Internet. Again, the present invention is not so limited. Any network, including wired, wireless, and hybrid networks, may perform the functions of network 120 without departing from the scope of the present invention.

In still another embodiment, the e-mail server 115 comprises one or more time management functions accessible to an e-mail client 100. By way of illustration and not as a limitation, a time management function comprises a calendar function, a task function, and a journal function. In an alternate embodiment, each time management function comprises a utility that is accessible to the e-mail server 115. E-mail messages constructed by a time management function are parsed by message server 125 based on the fields defined for that particular function.

Figure 2:
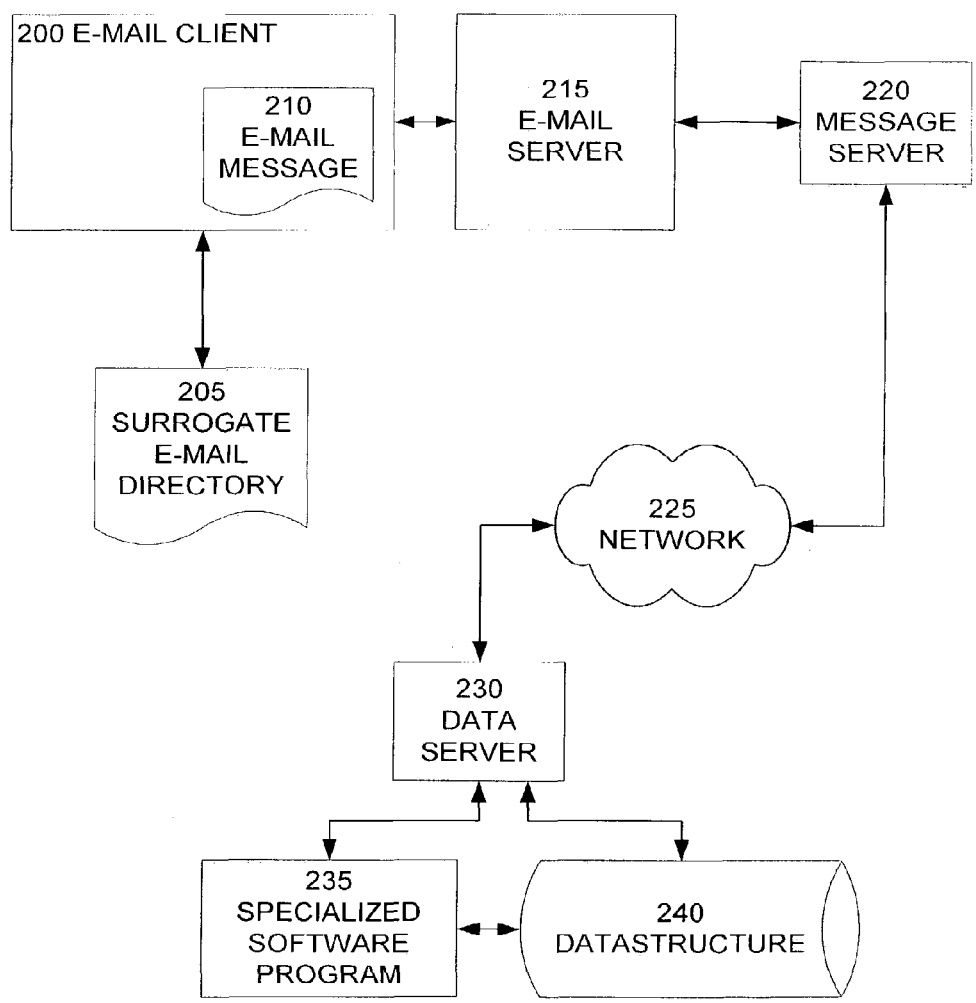
FIG. 2 illustrates a block diagram of a system for data collection and update utilizing surrogate e-mail addresses according to an alternate embodiment of the present invention.

FIG. 2 illustrates a block diagram of a system for data collection and update utilizing surrogate e-mail addresses according to an alternate embodiment of the present invention.

An e-mail client 200 accesses a directory 205 of surrogate e-mail addresses. An e-mail message 210 is constructed and sent to e-mail server 215. As described in the context of the embodiment illustrated by FIG. 1, the e-mail message 210 may be constructed by a user using the e-mail client 200 or by an application used by the user. By way of illustration and not as a limitation, a calendar function that communicates with e-mail client 200 may construct an e-mail message where the e-mail message 210 is in the form of a meeting invitation. The user "invites" a surrogate contact comprising a surrogate e-mail address to the "meeting". The calendar function sends a meeting invitation e-mail message to the surrogate e-mail address.

To the user (not shown), the e-mail client 200 and the e-mail server 215, the e-mail message 210 is like any other e-mail communication. However, in this embodiment, e-mail message 210 is sent to an e-mail address (the "surrogate e-mail address") that acts as a surrogate for instructions and data elements directed to a specialized software program 235. The surrogate e-mail address itself comprises elements that identify a unique context and/or action to be taken.

The surrogate e-mail address is generated based upon the particulars of the data elements being entered, updated or deleted for a particular specialized software program. The present invention does not rely upon any single format, so long as the e-mail address provides information sufficient to uniquely identify the necessary key fields of information.

The e-mail message 210 is conveyed to a message server 220. The message server 220 identifies the e-mail message 210 as having a surrogate e-mail address (see discussion relating to FIG. 1 above). The message server 220 parses the surrogate e-mail address and e-mail message 210 and sends the data via a network 225 to a data server 230. Thus, in this embodiment, the message server 220 monitors, intercepts and parses the e-mail message 210 before the e-mail message 210 is actually transmitted over network 225. The data server 230 translates the instructions and data elements conveyed by the e-mail message 210 so that the data may be accessed and used by the specialized software program 235. By way of illustration, specialized software program 235 may be a time collection and billing system, a customer relationship management system, accounting system, or a human resources system. However, the present invention is not so limited. As will be apparent to those skilled in the art, other specialized software programs may be used with the systems and method herein described without departing from the scope of the present invention.

The translation operation is managed via any programmatic means. By way of illustration and not as limitation, the translation operation may be managed using Structured Query Language (SQL) queries of the database, Application Programming Interface (API) calls provided by the specialized software, exchanging files, Simple Object Access Protocol (SOAP), Distributed Common Object Model (DCOM), Common Object Request Broker Architecture (CORBA), and Microsoft .NET Remoting. However, this is not meant as a limitation. As will be apparent to those skilled in the art, other programmatic translation means may be used without departing from the scope of the present invention.

In an alternate embodiment, the translation is also performed by the message server. In this embodiment, there is no data sever. Rather, the instruction and data elements are sent to the specialized software program 235 via network 225.

Both the data server 230 and the specialized software program 235 access a datastructure 240. Datastructure 240 provides storage for records used by the specialized software program 235. If the specialized software program provides an appropriate programmatic interface, the data server 230 communicates instructions and data elements to the specialized software program through that programmatic interface. Alternatively, where no appropriate programmatic interface is available, the data server interfaces with the datastructure 240 to perform data operations (add, delete, or update) directly on data that is accessible to the specialized software program 235.

While a single datastructure 240 is illustrated in FIG. 2, this is not meant as a limitation. As will be apparent to those skilled in the art, datastructure 240 may comprise discrete datastructures without departing from the scope of the present invention.

In an embodiment of the present invention, network 225 is the Internet. Again, the present invention is not so limited. Any network, including wired, wireless, and hybrid networks, may perform the functions of network 225 without departing from the scope the present invention.

In an alternate embodiment, the message server 220 intercepts the e-mail message 210 before the e-mail message 210 is actually transmitted over network 225 to the data server 230. This behavior permits the message server 220 to augment, modify, or block the e-mail message 210 based on rules applied by the message server 220. By way of illustration, and not as a limitation, instructions and data elements conveyed by e-mail message 210 are encrypted (before or after translation). In still another embodiment of the present invention, content inserted into an e-mail message by an e-mail server (for example, confidentiality statements, disclaimers, and signatures) are identified and deleted from a message before it is sent. In still another embodiment, additional information is added to the e-mail message 210 before it is sent to the data server 230. In this embodiment, data server 230 then parses the e-mail message 210 and the surrogate e-mail address, obtains the instructions and data elements directed to specialized software program 235, and translates the instructions and data elements as previously described.

Figure 3:
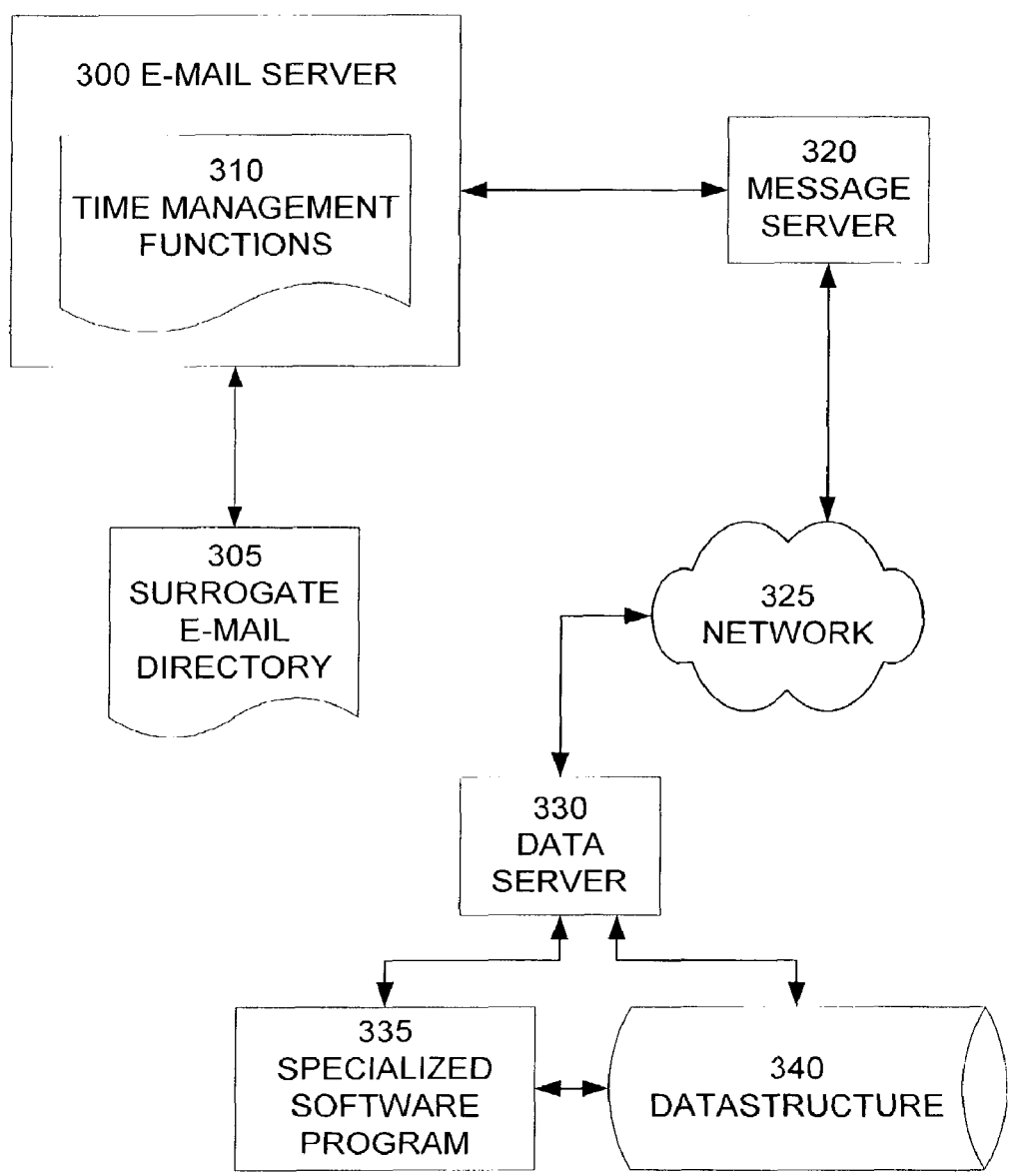
FIG. 3 illustrates a block diagram of a system for data collection and update utilizing surrogate e-mail addresses according to an alternate embodiment of the present invention in which a message server monitors an e-mail server.

FIG. 3 illustrates a block diagram of a system for data collection and update utilizing surrogate e-mail addresses according to an alternate embodiment of the present invention in which a message server monitors an e-mail server. The e-mail server 300 accesses a directory 305 of surrogate e-mail addresses. A message server 320 monitors the e-mail server 300 to determine if data has been recorded that is reportable to a data server 330. Reportable data is parsed and instructions and data elements conveyed to a data server 330. Both the data server 330 and the specialized software program 335, access a datastructure 340.

Recorded data is reportable if it includes at least one surrogate e-mail address and if the act of creating it is terminated in a specified way. By way of illustration, a user creates an e-mail message using a surrogate e-mail address and saves the e-mail message in a specified folder (activity terminated in a way that makes it reportable). Similarly, a user may create an appointment in a calendar "with" a surrogate e-mail address (activity terminated in a way that makes it reportable). Other activities using the calendar, journal and task scheduler to record data may be made reportable by configuring the message server 320 to monitor certain activities and to imply an intention to report them from specified behaviors. Once reportable activity has been identified, the message server 320 reads the recorded data, parses the surrogate e-mail address, and sends the instructions and data elements conveyed by the recorded data via a network 325 to the data server 330. The data server 330 translates the instructions and data elements so that the data may be accessed and used by a specialized software program 335. By way of illustration, specialized software program 335 may be a time collection and billing system, a customer relationship management system, accounting system, or a human resources system. However, the present invention is not so limited. As will be apparent to those skilled in the art, other specialized software programs may be used with the systems and method herein described without departing from the scope of the present invention.

In an alternate embodiment, the message server 320 captures the recorded data and sends it to the data server 330 where the data is parsed and translated. The translation operation is managed via any programmatic means. By way of illustration and not as limitation, the translation operation may be managed using Structured Query Language (SQL) queries of the database, Application Programming Interface (API) calls provided by the specialized software, exchanging files, Simple Object Access Protocol (SOAP), Distributed Common Object Model (DCOM), Common Object Request Broker Architecture (CORBA), and Microsoft .NET Remoting. However, this is not meant as a limitation. As will be apparent to those skilled in the art, other programmatic translation means may be used without departing from the scope of the present invention.

In another embodiment of the present invention, the e-mail server 300 optionally comprises one or more time management functions 310. In an embodiment of the present invention, the time management functions 310 comprise a calendar function, a task function, and a journal function. However, this is not meant as a limitation. In another embodiment, each time management function 310 comprises a utility that communicates with e-mail server 300. The message server 320 monitors the e-mail server 300, including any time management functions, to determine if data has been recorded that is reportable to a data server 330.

Figure 4:
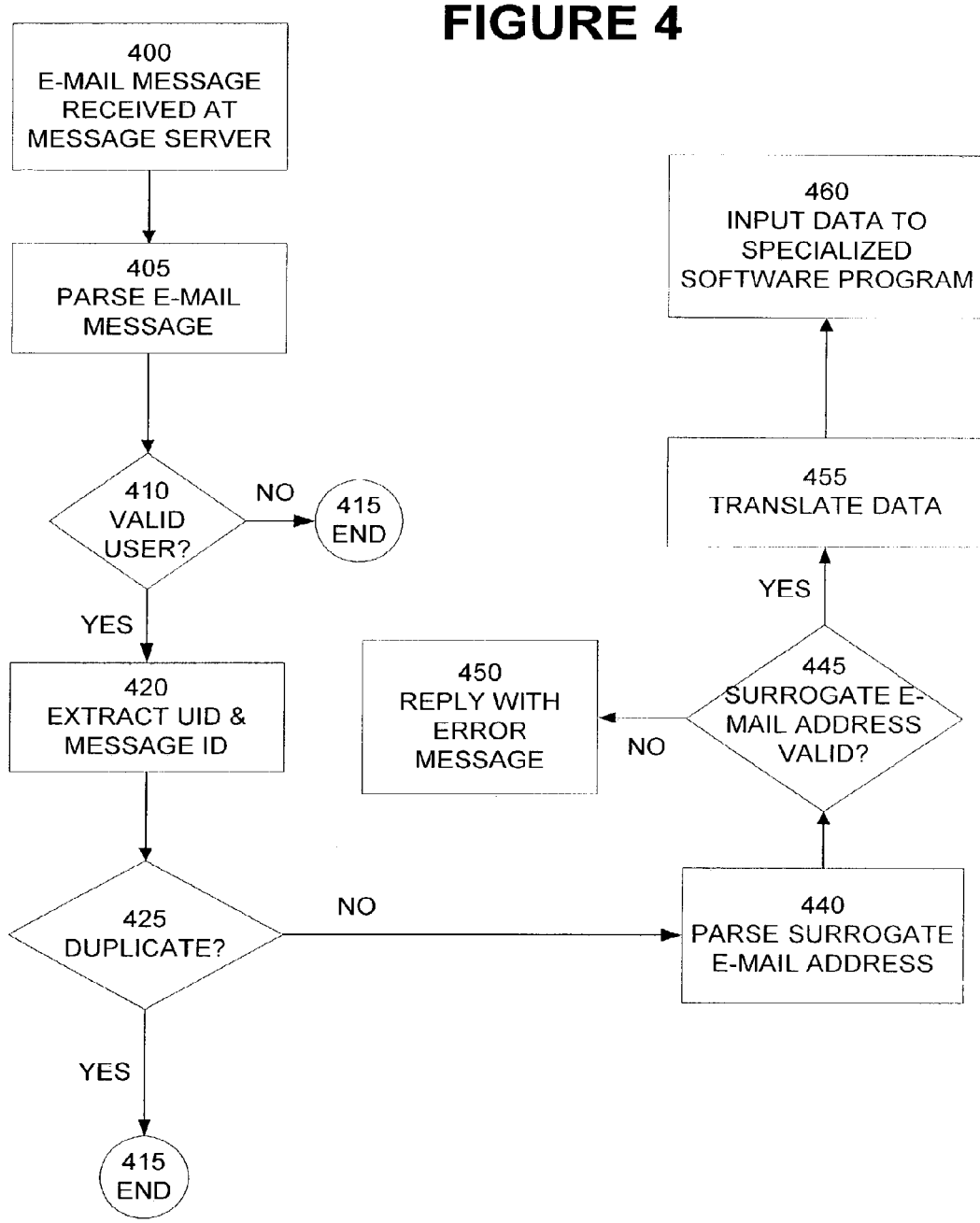
FIG. 4 illustrates a process flow for data collection and update utilizing surrogate e-mail addresses according to an embodiment of the present invention.

FIG. 4 illustrates a process flow for data collection and update utilizing surrogate e-mail addresses according to an embodiment of the present invention. An e-mail message is received at a message server 400 and the e-mail message is parsed 405. In one embodiment of the present invention, the message server receives and processes Internet Mail Format (IMF) messages sent over a network using the Simple Mail Transport Protocol (SMTP). (See FIG. 1). The message server monitors and receives SMTP messages sent to the configured domain. The message server is capable of parsing e-mail messages and attachments in any standard format, including (but not limited to) iCalendar, vCalendar, vCard and Transport Neutral Encoding Format (TNEF) using industry-standard practices. The iCalendar, vCalendar and vCard formats are text formats with published format definitions. The TNEF format is a binary format proprietary to Microsoft. Microsoft has provided multiple means to parse TNEF, including Collaborative Data Objects (CDO) and Messaging Application Programming Interface (MAPI). The message server is not, however, limited to these message formats. As will be apparent to those skilled in the art, other message formats may be used without departing from the scope of the present invention.

The message server is also capable of intercepting and parsing messages received by the e-mail server before the e-mail messages are sent via SMTP. (See FIG. 2.) In this embodiment, the message server also serves to prevent messages from being sent, to send messages to ensure data integrity if the e-mail server fails to send an e-mail message, to parse messages and apply updates to specialized software programs without the e-mail message being sent, or to monitor an e-mail server and to send information or perform other actions based upon behaviors other than a user explicitly sending an e-mail message (See FIG. 3). In yet another embodiment of the present invention, instructions and data elements are encrypted (before or after translation). In still another embodiment of the present invention, content inserted into an e-mail message by a message server is identified and deleted from a message before it is sent. By way of illustration and not as a limitation, inserted confidentiality statements, disclaimers, and signatures are removed from the NOTES field based upon a configured template.

Returning to FIG. 4, the message server parses the fields of the e-mail message 405 (e.g., TO, FROM, SUBJECT, NOTES, START DATE, START TIME, END DATE, END TIME, etc.) and verifies that the sender's e-mail address 410 is a valid address of a duly authorized user of the system. Messages from senders that are not valid and duly authorized are ignored 415.

If the user is an authorized user, the Universal Identifier (UID) and the e-mail MESSAGE ID are extracted 420 from the e-mail message. The UID is an element of the Internet standards for e-mail messages and uniquely identifies a particular message. The message server uses the UID to match an updated message to the previous versions of the same message. The UID remains constant when, for example, meeting invitation e-mail messages are updated or canceled. The MESSAGE ID is a globally unique identifier representing a single message. Unlike the UID, when a message is updated, forwarded, or replied to, the e-mail MESSAGE ID changes. The message server uses the e-mail MESSAGE ID to positively identify duplicate e-mail messages 425.

The message server then uses the e-mail MESSAGE ID to ensure that the e-mail message is not a duplicate message 425. Duplicate messages are ignored 415. The message server then parses the surrogate e-mail address 440 and verifies that the unique identifiers in the surrogate e-mail address are valid and available for use 445. If the identifiers in the e-mail address cannot be resolved to valid and available data items, an error message is sent 450 back to the user via e-mail. If the identifiers in the surrogate e-mail address are valid, they are captured and used to associate the data conveyed by the e-mail message to a particular specialized software program 460 or a record accessed by such an application. By way of illustration and not as a limitation, in a consulting environment, the specialized software program comprises a time entry system and the identifiers comprise a client identifier and a project identifier.

Once the message server has established the validity of the user and the data items involved, the message server translates 455 the instructions and data elements based upon the particular requirements of the specialized software program to which the data will be directed. The translation operation is managed via any programmatic means. By way of illustration and not as limitation, the translation operation may be managed using Structured Query Language (SQL) queries of the database, Application Programming Interface (API) calls provided by the specialized software, exchanging files, Simple Object Access Protocol (SOAP), Distributed Common Object Model (DCOM), Common Object Request Broker Architecture (CORBA), and Microsoft .NET Remoting. However, this is not meant as a limitation. As will be apparent to those skilled in the art, other programmatic translation means may be used without departing from the scope of the present invention.

The message server interacts with a specialized software program, such as a time collection and billing system, a customer relationship management system, accounting system, and a human resources system. However, the present invention is not so limited. As will be apparent to those skilled in the art, other specialized software programs may be used with the systems and method herein described without departing from the scope of the present invention.

The data is then directed to the specialized software program 460 for processing. If the specialized software program provides an appropriate programmatic interface, instructions and data elements are communicated to the specialized software program through that programmatic interface. Alternatively, where no appropriate programmatic interface is available, operations (add, delete, or update) are performed directly on data that is accessible to the specialized software program.

Figure 5A:
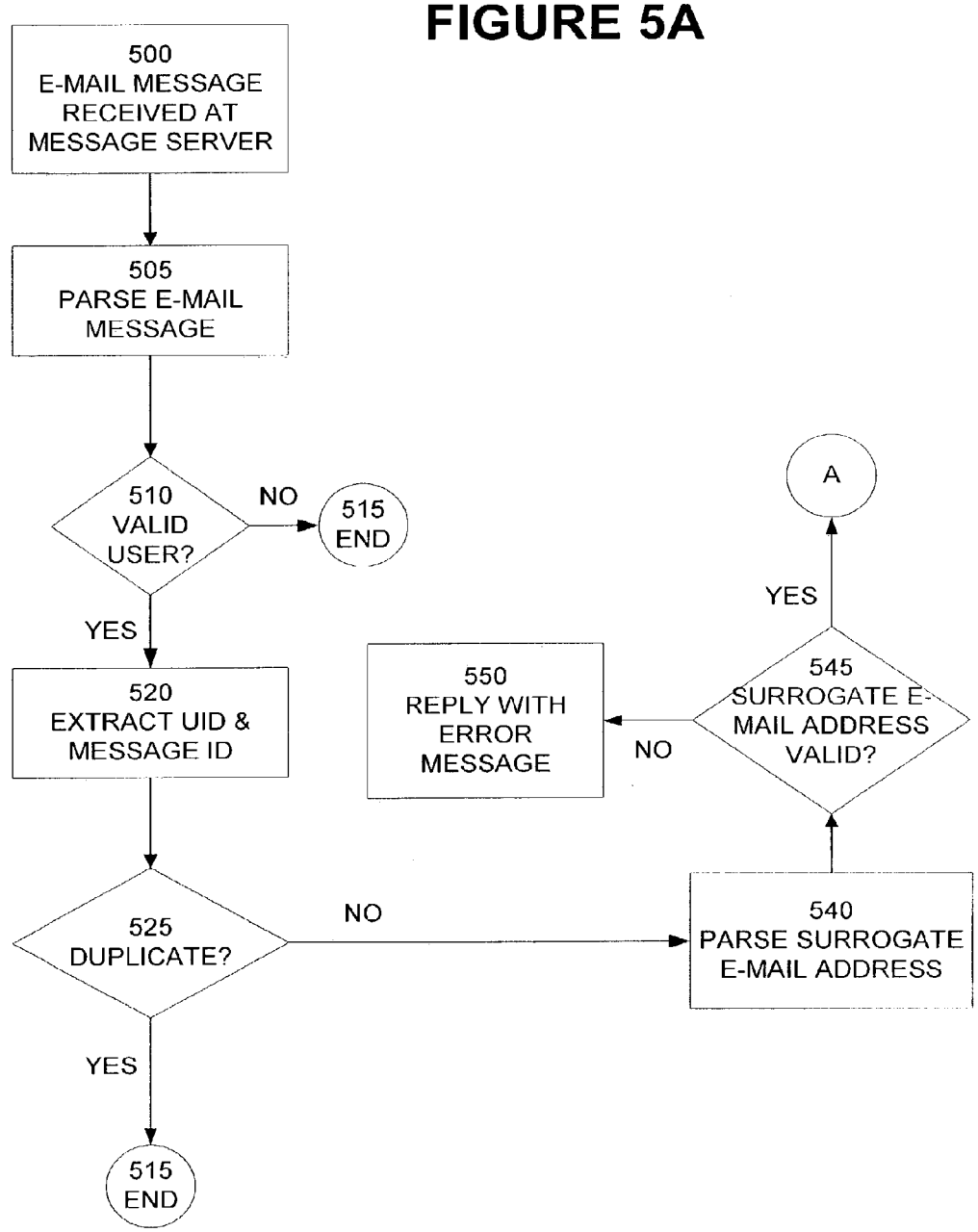
FIGS. 5A and 5B illustrate a process flow for data collection and update utilizing surrogate e-mail addresses in a time-entry system according to an embodiment of the present invention.

FIG. 5 illustrates a process flow for data collection and update utilizing surrogate e-mail addresses in a time-entry system according to an embodiment of the present invention. In this embodiment, the surrogate e-mail address contains the identifiers for a client/project to which time is to be charged.

An e-mail message is received at a message server 500 and the e-mail message is parsed 505. In one embodiment of the present invention, the message server receives and processes Internet Mail Format (IMF) messages sent over a network using the Simple Mail Transport Protocol (SMTP). (See FIG. 1). The message server monitors and receives SMTP messages sent to the configured domain. The message server is cable of parsing e-mail messages and attachments in any standard format, including (but not limited to) iCalendar, vCalendar, vCard and Transport Neutral Encoding Format (TNEF) using industry-standard practices. The iCalendar, vCalendar and vCard formats are text formats with published format definitions. The TNEF format is a binary format proprietary to Microsoft. Microsoft has provided multiple means to parse TNEF, including Collaborative Data Objects (CDO) and Messaging Application Programming Interface (MAPI). The message server is not, however, limited to these message formats. As will be apparent to those skilled in the art, other message formats may be used without departing from the scope of the present invention.

The message server is also capable of intercepting and parsing messages received by the e-mail server before the e-mail messages are sent via SMTP. (See FIG. 2.) In alternate embodiments of the present invention, the message server also serves to prevent messages from being sent, to send messages to ensure data integrity if the e-mail server fails to send an e-mail message, to parse messages and apply updates to specialized software programs without the e-mail message being sent, and to monitor an e-mail server and send information or perform other actions based upon behaviors other than a user explicitly sending an e-mail message. In yet another embodiment of the present invention, the instructions and data elements are encrypted (before or after translation). In still another embodiment of the present invention, content inserted into an e-mail message by a message server is identified and deleted from a message before it is sent. By way of illustration and not as a limitation, inserted confidentiality statements, disclaimers, and signatures removed from the NOTES field based upon a configured template.

Returning to FIG. 5A, the message server parses the fields of the e-mail message 505 (e.g., TO, FROM, SUBJECT, NOTES, START DATE, START TIME, END DATE, END TIME, etc.) and verifies that the sender's e-mail address 510 is a valid address of a duly authorized user of the system. Messages from senders that are not valid and duly authorized are ignored 515.

If the user is an authorized user, the Universal Identifier (UID) and the e-mail MESSAGE ID are extracted 520 from the e-mail message. The UID is an element of the Internet standards for e-mail messages and uniquely identifies a particular message. The message server uses the UID to match an updated message to the previous versions of the same message. The UID remains constant when, for example, meeting invitation e-mail messages are updated or canceled. The MESSAGE ID is a globally unique identifier representing a single message. Unlike the UID, when a message is updated, forwarded, or replied to, the e-mail MESSAGE ID changes. The message server uses the e-mail MESSAGE ID to positively identify duplicate e-mail messages.

The message server then uses the e-mail MESSAGE ID to ensure that the e-mail message is not a duplicate message 525. Duplicate messages are ignored 515. The message server then parses the surrogate e-mail address 540 and verifies that the unique identifiers in the surrogate e-mail address are valid and available for use 545. If the identifiers in the e-mail address cannot be resolved to valid and available data items, an error message is sent 550 back to the user via e-mail. If the identifiers in the surrogate e-mail address are valid, they are captured and used to relate time entries to a particular client and project. In this embodiment of the present invention, the e-mail address contains the unique identifiers for the client/project. If the present invention is used in an environment where multiple companies' data is housed, such as an application service provider, the address may also contain an identifier for the company. However, this identifier is not required for uniqueness across companies, as the sender's e-mail address provides the necessary information to identify the user's company.

In an alternate embodiment of the present invention, additional specificity of information is achieved by inviting multiple contacts (each comprising a surrogate e-mail address) to the same meeting, or by attaching multiple contacts to an e-mail message. For example, in a time collection and billing embodiment of the present invention, the user could invite one surrogate contact representing the client/project to which the time is billed and a second surrogate contact representing a task or activity code that further defines the scope or type of work performed. Additionally, the cost of the time may be allocated among multiple client/projects by inviting multiple contacts to the meeting. Where multiple surrogate e-mail addresses are used, each surrogate e-mail address is checked for validity (see FIG. 5, 545).

Figure 5B:
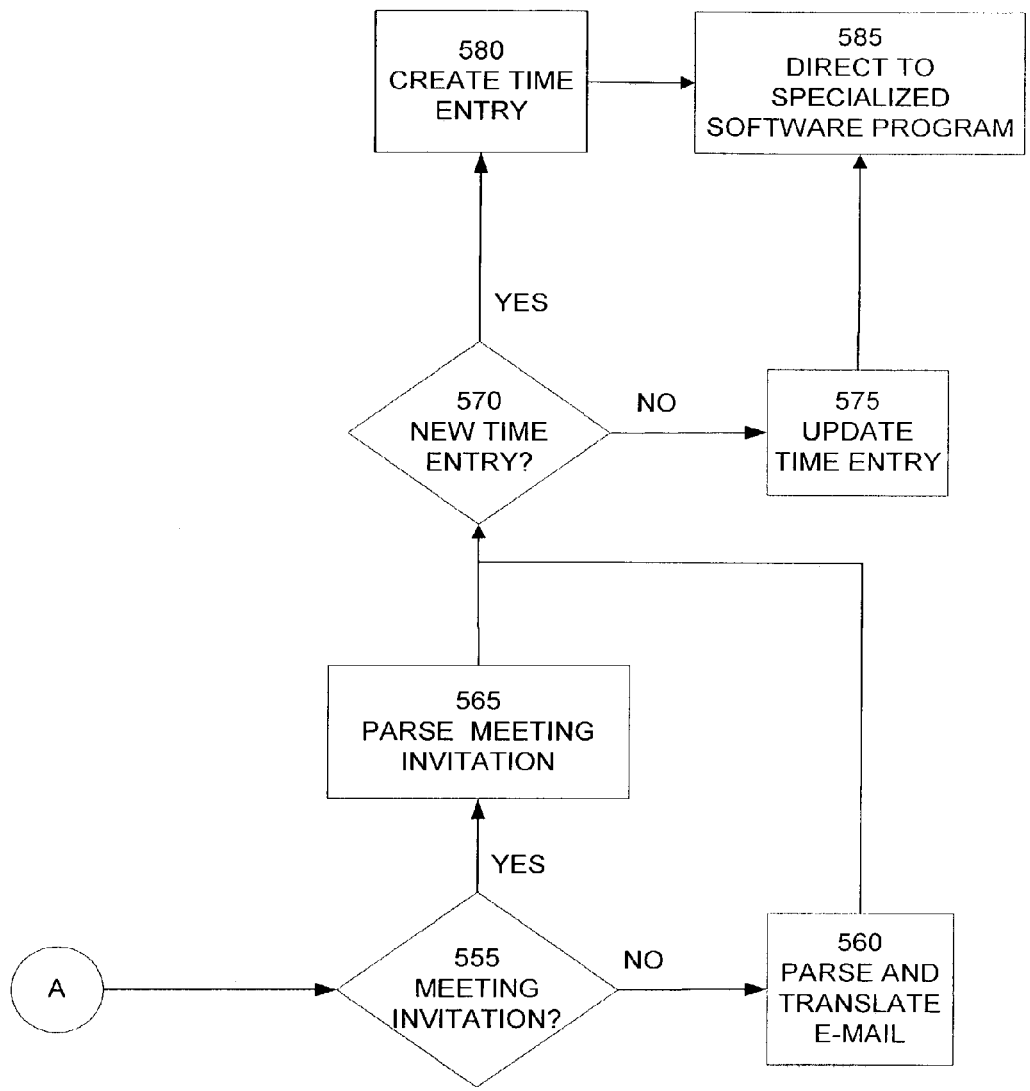

Referring to FIG. 5B, a determination is made whether the e-mail message is a meeting invitation 555. A meeting invitation comprises a START DATE and START TIME and an END DATE and END TIME. If the e-mail message is a meeting invitation, the meeting invitation is parsed 565. The START DATE and START TIME are used to determine the starting point for the entry. The END DATE and END TIME are used to calculate the duration of the time entry.

If the e-mail message is not a meeting invitation but rather a standard e-mail message, the beginning of the subject line is parsed 560. If the first characters of the subject are numeric, the value is assumed to be the duration of the entry. The date of the time entry is assumed to be the date that the e-mail message was sent, and the starting time is set to a value based on the time entry date and the duration entry. The SUBJECT and NOTES fields of the e-mail message provide a work product description (i.e., narrative text) and for internal notes not sent to the client. Configuration values determine which field in the e-mail message is mapped to which field in the time entry. In an embodiment of the present invention, content inserted into an e-mail message by an e-mail server is identified and deleted from a message before it is sent. By way of illustration and not as a limitation, inserted confidentiality statements, disclaimers, and signatures removed from the NOTES field based upon a configured template. If the UID has not been received previously, it is inferred that the e-mail message concerns a new time entry. If a message with the same UID but a different MESSAGE ID has been received previously, it is inferred that the e-mail message represents either an update or a delete command. The message server determines if the e-mail message is a delete (cancel) by inspecting the meeting status attribute included within the calendar part of the e-mail message. If the e-mail message represents a deletion, the message server interacts with the specialized software application to which the e-mail message is directed to delete the data. In the case of an update, the information conveyed by the e-mail message is translated and the resulting values are determined in accordance with the configuration of the message server.

The time entry is evaluated 570 to determine if it represents a new time entry. If the time entry is not new, a current time entry for the project is updated 575. If the time entry is new, a time entry for the project is created 580 and directed to the specialized software program 585. If the specialized software program provides an appropriate programmatic interface, instructions and data elements are communicated to the specialized software program through that programmatic interface. Alternatively, where no appropriate programmatic interface is available, operations (add, delete, or update) are performed directly on data that is accessible to the specialized software program.

While FIG. 5 illustrates a time entry system according to an embodiment of the present invention, the present invention is not so limited.

In yet another embodiment of the present invention, information is gathered utilizing surrogate e-mail addresses to support a customer relationship management system. In this embodiment, the surrogate e-mail address comprises identifiers for a client and a contact person associated with the client. The message server receives an e-mail message. If a contact record is attached to the e-mail message, the values in the contact record are used to update the contact information for the client and contact person associated with the client. The SENT DATE/TIME field provides the date/time of the change. The FROM field provides the identity of the person making the change. If the e-mail message is a meeting invitation, the message server inserts or updates a record of interaction with the client. The START DATE and START TIME fields are used to record the date and time of the interaction. The FROM field is used to record the identity of the employee having the interaction. The meeting START DATE, START TIME, END DATE and END TIME fields are used to provide the date, time and duration of the interaction. The SUBJECT field is used to provide a short summary of the meeting, such as "Meeting" or "Conference call", while the NOTES field is used to record the complete description of the interaction.

In another embodiment of the present invention in which the specialized software program represents an accounting system, the surrogate e-mail address provides identifiers for the client and project to be charged and the general ledger or other billing code to which the charge is applied in the accounting system. The FROM field provides the identity of the employee submitting the charge. The SENT DATE field provides the date of the charge, unless the e-mail message is a meeting invitation, in which case the START DATE is used as the date of the charge. The SUBJECT field provides the amount of the charge, and the NOTES field provides the explanation for the charge.

In still another embodiment of the present invention in which the specialized software program represents a human resources management system, the surrogate e-mail address provides identifiers classifying the type of request or transaction, such as paid time off request or sick day report. The FROM field provides the identity of the employee submitting the request or transaction. If the e-mail message is a meeting invitation, the START DATE, START TIME, END DATE and END TIME fields are used to establish the span of time involved in the request or transaction. If the e-mail message is not a meeting invitation, the SUBJECT line is parsed to determine the start date/time and end date/time using standard date/time formats. The NOTES field provides an explanation of the reason for the request or other details of the transaction.

Figure 6:
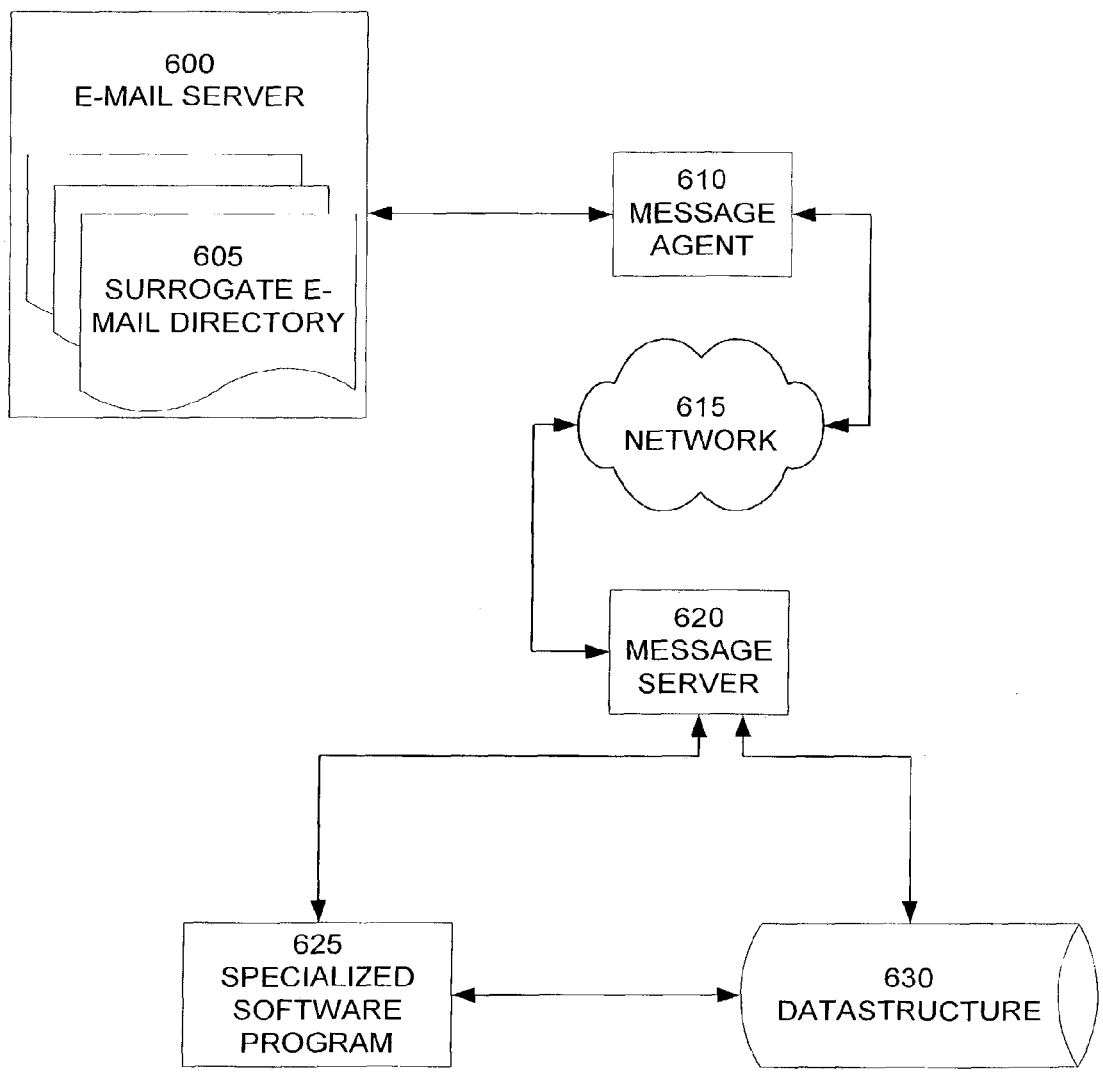
FIG. 6 illustrates a block diagram of a system for data collection and update utilizing surrogate e-mail addresses according to an embodiment of the present invention in which a message agent manages a directory of surrogate e-mail address.

In another embodiment of the present invention, a message server and a message agent are used to manage the maintenance of the surrogate e-mail addresses. FIG. 6 illustrates a block diagram of a system for data collection and update utilizing surrogate e-mail addresses according to an embodiment of the present invention in which a message agent manages a directory of surrogate e-mail address. The message agent 610 is on, or accessible to, an e-mail server 600. E-mail server 600 comprises surrogate e-mail directory 605. In an alternate embodiment, surrogate e-mail directory 605 is remote from, but accessible to, e-mail server 600. A message server 620 is linked to a specialized software program 625 and datastructure 630. The message server 620 receives one or more data elements from the specialized software program 625, generates a surrogate e-mail address and sends it to the message agent 610. The message agent 610 uses the surrogate e-mail address sent by message server 620 to insert, update or delete (as appropriate) surrogate e-mail directory records within surrogate e-mail directory 605. This embodiment frees the user from maintenance tasks related to the surrogate e-mail addresses, further improving the user experience.

In another embodiment of the present invention, a proprietary software extension installed on the user's computer inserts an additional toolbar into the user's e-mail client. The toolbar displays buttons that represent contact records containing surrogate e-mail addresses. When the user clicks a toolbar button, the button begins timing the task. When the button is clicked again, or when a different button is clicked, a meeting invitation is inserted into the user's calendar representing the starting time and date as well as the duration of the task, invites the surrogate contact to the meeting, and sends the meeting invitation. This embodiment improves the user experience by allowing the user to create time entries by timing the task, at the cost of having an additional software application to install on the user's computer.

In another embodiment of the present invention, a proprietary software extension installed on a user's computer interacts with a user's ubiquitous software program (e.g., word processing software, spreadsheet, presentation software, etc.). When a new document is created in the office productivity software, the proprietary extension displays a dialog box allowing the user to associate the new document with a contact record comprising a surrogate e-mail address that represents a client/project. The proprietary extension adds the surrogate e-mail address to the document as a hidden element and begins timing the task of working on the document. When the user completes the changes to the document, the proprietary extension offers the user the opportunity to record a time entry representing the time spent working on the document. The proprietary extension then creates a meeting invitation e-mail message in the user's calendar representing the date, start time, and stop time as well as including details extracted from the document (file name, document summary, etc.), and sends the meeting invitation e-mail message. The meeting invitation e-mail message is processed by the message server using any of the methods previously described. When the same document is subsequently opened, the user is again offered the opportunity to record the time spent working on the document, but without requiring the user to select a surrogate e-mail address to associate with the document.

In another embodiment of the present invention, a proprietary software extension is installed on the user's computer that provides additional forms within a ubiquitous software program that are specific to a specialized software program, such as a time collection and billing system, a human resources management system, a customer relationship management system, or an accounting system. The forms create meeting invitations and/or e-mail messages addressed to a surrogate e-mail address that are functionally identical to the message produced by the user using the ubiquitous software program alone and that are processed by a message server using any of the methods previously described. The forms enhance the user experience by providing a user interface more tailored to the particular specialized software program. As an illustration and not as a limitation, a form filters a list of contacts from which the user is permitted to address meeting invitation messages to those contacts representing surrogate e-mail addresses. Alternatively, a form utilizes vocabulary specific to the specialized software program rather than the vocabulary of a generic meeting invitation message or e-mail message.

In yet another embodiment of the present invention, a user initiates a conversation using an Internet messaging program. The user converses with a server that prompts for the required information by asking questions. Answers provided by the user form the basis for inserting, updating or deleting information in the specialized software program. The user only needs to know how to initiate and respond to a conversation using an Internet messaging program.

In still another embodiment of the present invention, a user works with an interactive voice response (IVR) system to insert, update or delete information in the specialized software program. The IVR prompts the user for information using voice synthesis, voice recognition and numeric entry. The user does not need to know how to use the specialized software, only how to use a telephone.

In another embodiment of the present invention, a message server serves as a universal platform that supports processing standard e-mail and meeting invitation messages generated by any software application capable of creating and sending e-mail messages. Any software developer can leverage the message server platform to interface with a specialized software program without the specialized software program vendor providing the programmatic interface directly to the software developer. The software developer sends instructions and data elements to the specialized software program by creating industry-standard e-mail messages and sending them to the message server, which processes the e-mail messages using any of the methods described above.

A system and method for data collection and update utilizing a surrogate e-mail address using a server has been described. It will be understood by those skilled in the art that the present invention may be embodied in other specific forms without departing from the scope of the present invention disclosed and that the examples and embodiments described herein are in all respects illustrative and not restrictive. Those skilled in the art of the present invention will recognize that other embodiments using the concepts described herein are also possible.

We claim:

1. A system for data collection, comprising:
a computer processor;
an e-mail server;
a first surrogate e-mail address corresponding to a first specialized software program external to the e-mail server; and
a second surrogate e-mail address corresponding to a second specialized software program external to the e-mail server; and
a message server executing on the computer processor and configured to:
identify, in the e-mail server, a first e-mail message comprising the first surrogate e-mail address;
match the first surrogate e-mail address to the first specialized software program;
extract, from the first e-mail message, a first instruction directed to the first specialized software program;
execute the first instruction to modify a first data element of the first specialized software program;
identify, in the e-mail server, a second e-mail message comprising the second surrogate e-mail address;
match the second surrogate e-mail address to the second specialized software program;
extract, from the second e-mail message, a second instruction directed to the second specialized software program; and
execute the second instruction to modify a second data element of the second specialized software program.

2. The system of claim 1, wherein the first instruction is an add command.

3. The system of claim 1, wherein the first instruction is a delete command.

4. The system of claim 1, wherein the first instruction is an update command.

5. The system of claim 1, wherein the first data element is a start time value.

6. The system of claim 1, wherein the first data element is a stop time value.

7. The system of claim 1, wherein the first data element is a duration time value.

8. The system of claim 1, wherein the first data element is a client identifier value.

9. The system of claim 1, wherein the first data element is a project identifier value.

10. The system of claim 1, wherein the first data element is a task identifier value.

11. The system of claim 1, wherein the first data element is a narrative description value.

12. The system of claim 1, wherein the first e-mail message comprises a meeting invitation.

13. The system of claim 1, wherein the first specialized software program is one selected from a group consisting of a time entry application, an accounting application, a human resources application, and a customer relationship management application.

14. The system of claim 1, further comprising:
a data server configured to:
receive the first instruction from the message server; and
execute the first instruction on a plurality of application data used by the first specialized software program.

15. The system of claim 1, wherein the message server is further configured to:
execute the first instruction by performing an operation using the first specialized software program.

16. A method of collecting data directed to a specialized software program, the method comprising:
associating a first surrogate e-mail address with a first specialized software program, wherein the first specialized software program is external to an e-mail server of the first surrogate e-mail address;
associating a second surrogate e-mail address with a second specialized software program, wherein the second specialized software program is external to the e-mail server of the second surrogate e-mail address;
identifying a first e-mail message comprising the first surrogate e-mail address;
matching the first surrogate e-mail address to the first specialized software program;
extracting, by a computer processor, a first instruction directed to the first specialized software program from the first e-mail message;
executing the first instruction to modify a first data element of the first specialized software program;
identifying a second e-mail message comprising the second surrogate e-mail address;
matching the second surrogate e-mail address to the second specialized software program;
extracting, by the computer processor, a second instruction directed to the second specialized software program from the second e-mail message; and
executing the second instruction to modify a second data element of the second specialized software program.

17. The method of claim 16, wherein the first instruction is an add command.

18. The method of claim 16, wherein the first instruction is a delete command.

19. The method of claim 16, wherein the first instruction is an update command.

20. The method of claim 16, wherein the first data element is a start time value.

21. The method of claim 16, wherein the first data element is a stop time value.

22. The method of claim 16, wherein the first data element is a duration time value.

23. The method of claim 16, wherein the first data element is a client identifier value.

24. The method of claim 16, wherein the first data element is a project identifier value.

25. The method of claim 16, wherein the first data element is a task identifier value.

26. The method of claim 16, wherein the first data element is a narrative description value.

27. The method of claim 16, wherein the first specialized software program is one selected from a group consisting of a time entry application, an accounting application, a human resources application, and a customer relationship management application.

28. The method of claim 16, wherein the first e-mail message comprises a meeting invitation.

29. The method of claim 16, further comprising:
providing the first instruction to the first specialized software program.

30. A system for data collection comprising:
a computer processor;
a message server executing on the computer processor and configured to:
associate a first surrogate e-mail address with a first specialized software program, wherein the first specialized software program is external to an e-mail server of the first surrogate e-mail address;
associate a second surrogate e-mail address with a second specialized software program, wherein the second specialized software program is external to the e-mail server of the second surrogate e-mail address;
monitor the e-mail server for e-mail messages addressed at least to the first surrogate e-mail address and the second surrogate e-mail address;
identify first e-mail message addressed to the first surrogate e-mail address;
filter, according to a first template, a first plurality of text from the first e-mail message to generate a first processed e-mail message;
identify a second e-mail message addressed to the second surrogate e-mail address;
filter, according to a second template, a second plurality of text from the second e-mail message to generate a second processed e-mail message; and
send the first processed e-mail message and the second processed e-mail message to a data server; and
the data server configured to:
receive the first processed e-mail message and the second processed e-mail message;
extract, from the first processed e-mail message, a first instruction directed to the first specialized software program;
execute the first instruction by performing a first operation using the first specialized software program;
extract, from the second processed e-mail message, a second instruction directed to the second specialized software program; and
execute the second instruction by performing a second operation using the second specialized software program.

31. The system of claim 30, wherein the first instruction is an add command.

32. The system of claim 30, wherein the first instruction is a delete command.

33. The system of claim 30, wherein the first instruction is an update command.

34. The system of claim 30, wherein the data element is a start time value.

35. The system of claim 30, wherein the first operation modifies a stop time value.

36. The system of claim 30, wherein the first operation modifies a duration time value.

37. The system of claim 30, wherein the first operation modifies a client identifier value.

38. The system of claim 30, wherein the first operation modifies a project identifier value.

39. The system of claim 30, wherein the first operation modifies a task identifier value.

40. The system of claim 30, wherein the first operation modifies a narrative description value.

41. The system of claim 30, wherein the message server is further configured to block transmission of the first e-mail message according to the first template.

42. The system of claim 30, wherein the message server is further configured to add content to the first e-mail message according to the first template.

43. The system of claim 30, wherein the first specialized software program is one selected from a group consisting of a time entry application, an accounting application, a human resources application, and a customer relationship management application.

44. The system of claim 30, wherein the data server is further configured to:
provide the first instruction to the first specialized software program.

45. The system of claim 30, wherein the first e-mail message comprises a meeting invitation message.

* * * * *